Patented June 8, 1954

2,680,679

UNITED STATES PATENT OFFICE 2,680,679

MANUFACTURE OF FERTILIZERS

Edward W. Harvey, Highland Park, and George L. Frear, Neshanic, N. J., assignors to Allied Chemical & Dye Corporation, New York, N. Y., a corporation of New York No Drawing. Application February 16, 1951, Serial No. 211,436

3 Claims. (Cl. 71—37)

This invention relates to the preparation of nitrogen-phosphate containing fertilizers and is especially concerned with a continuous process for making "complete" fertilizers of this type having the required amounts of phosphorus and nitrogen, along with other conventional fertilizer elements such as potash salts, etc., involving a short overall reaction period and elimination of the usual prolonged curing periods.

In conventional processes for making so-called ammoniated superphosphate fertilizers, phosphate rock is mixed with sulfuric acid, generally in closely controlled proportions, the quantity of acid being just about adequate to convert the phosphate rock into water-soluble monocalcium phosphate, $CaH_4(PO_4)_2$, with calcium sulfate and free phosphoric acid also being produced. The product composition thus formed is commonly known as superphosphate. In order to bring the acidulation reaction to completion, the superphosphate material must then be cured by aging in storage for some one to two weeks or more to convert the insoluble tricalcium phosphate in the rock more completely to the soluble monocalcium phosphate. After curing, the resulting superphosphate material is milled and treated with an ammoniating agent such as gaseous ammonia to convert the monocalcium phosphate to dicalcium phosphate ($CaHPO_4$), ammonium sulfate and phosphate also being formed. The dicalcium phosphate, although insoluble in water, is "citrate-soluble" and the $P_2O_5$ content thereof is in available form as a plant nutrient. The nitrogen furnished by the presence of the ammonium radical also functions as an important plant food. In conventional operations, it is usually necessary to add to the ammoniated superphosphate separately prepared additional ammonium sulfate in order to supply the remainder of the desired nitrogen content. Elimination of costly additional treatments of this type is of considerable importance in the industry.

In conventional fertilizer manufacture the potash salts and minor elements required in a "complete" fertilizer may be added after ammoniation in final mixing of solids, or are often added as solid salts, immediately before ammoniation. The introduction of these substances induces further chemical reaction including interchange of acidic ions between the principal metallic ions, formation of double salts and solid solutions, and possibly polymorphic changes in individual crystalline substances. Crystal changes which result from reactions of this sort tend to cause undesirable caking.

Further, fertilizer mixtures are commonly cured by standing for some days after ammoniation to allow such mixtures to become stabilized. The time necessary for stabilization depends on the temperature and moisture content of the mixture. After curing, the mixtures are generally remilled prior to bagging. These operations are time-consuming and troublesome, and means for their elimination are highly desirable.

It has been proposed to react phosphate rock with a limited excess of sulfuric acid to obtain a mixture of phosphoric acid, calcium sulfate and unreacted sulfuric acid, to separate the calcium sulfate from the mixture by filtration, and to react the resulting acid filtrate with ammonia to produce ammonium phosphate. It also has been proposed to prepare a fertilizer material by mixing calcium sulfate dihydrate with commercial 80% phosphoric acid in equimolecular proportions and ammoniating the mixture, in the absence of any other free acids, with just sufficient ammonia to form dicalcium phosphate, thus excluding transformation of the latter to the insoluble tricalcium phosphate. So far as we are aware, however, no process has heretofore been developed for making ammoniated superphosphate or nitrogen-phosphate base fertilizers containing dicalcium phosphate, by aciduation of phosphate rock with a sulfuric acid medium followed directly by ammoniation in the presence of calcium sulfate, without the necessity for curing the reaction mixture over a prolonged period prior to ammoniation.

It is an object of the invention to prepare nitrogen-phosphate containing fertilizers by a simple improved procedure.

Another object is the provision of an improved process for preparing a fertilizer material containing a high percentage of $P_2O_5$ in available form involving acidification of phosphate rock and treatment of the resulting mixture with an ammoniating medium.

Yet another object is to furnish a process for conversion of phosphate rock to a nitrogen-phosphate base fertilizer wherein a substantial proportion of the phosphate content of the rock is in the form of dicalcium phosphate, involving acidulation of the rock using an acid medium containing sulfuric acid followed directly by ammoniation without the necessity for curing the acidulated material prior to ammoniation in order to complete the acid reaction.

Another aim of the invention is to provide a continuous process for making a nitrogen-phosphate base fertilizer of high uniformity, of stable salt components and free-flowing characteristics and having its phosphate content chiefly in the form of dicalcium phosphate and ammonium phosphates, by acidulating phosphate rock with an acid medium containing a substantial proportion of sulfuric acid and ammoniating the resulting slurry or paste under conditions to avoid curing the mixture before ammoniation.

Still another object of the invention is the preparation of a stable, free-flowing "complete" fertilizer containing the required amounts of phosphorus (as available $P_2O_5$), nitrogen and other conventional fertilizer elements, e. g. potash salts, in a single continuous operation and eliminating the curing periods both before and after ammoniation usually required in conventional processes for production of "complete" fertilizers.

A further object is the provision of a more economical process for making nitrogen-phosphate base fertilizers by sulfuric acid acidulation of phosphate rock followed by ammoniation, such process affording enhanced product capacity and requiring less handling and fewer operations than prior art processes.

Other objects and advantages of the invention will appear hereinafter.

In accordance with the foregoing objects, we have found that substantially complete conversion of phosphate rock into a nitrogen-phosphate containing fertilizer having a high proportion of its $P_2O_5$ content in available form, may be effected in a remarkably short time and with complete elimination of the previously required curing period prior to ammoniation, and, if desired, by completely continuous operation, by treating the phosphate rock (tricalcium phosphate) with a sulfuric acid medium, i. e. sulfuric acid or certain hereinafter specified mixtures of sulfuric and other strong acids, and reacting the resulting mixture containing free phosphoric acid and calcium sulfate, without any intervening curing period, with an ammoniating agent, such as gaseous ammonia, in amount sufficient to transform a major portion of the phosphate content of such mixture to dicalcium phosphate and ammonium phosphates. The acid medium contains $H_2SO_4$ in a proportion of at least 2 equivalents per 3 equivalents of any other acid constituents present and the amount of total acid present is substantially in excess of that theoretically required to convert the phosphate content of the rock substantially to phosphoric acid. Preferably, the acid reaction mixture is in fluid condition during ammoniation, such condition being obtained by dilution, if necessary, prior to ammoniation.

By practice of the invention process, particularly under certain hereinafter described conditions, one is enabled to prepare a fertilizer material of high plant available nitrogen, phosphorus and potash content wherein substantially all of the phosphorus is present in at least "citrate-soluble" form, the process being readily adapted to produce a fertilizer material of good uniformity, salt stability and free-flowing characteristics at high capacity and with a minimum of labor and handling. The process of this invention further makes it possible to produce a "complete" fertilizer containing, in addition to the proper quantity of available $P_2O_5$ and $K_2O$, the required amount of ammonium compounds, including ammonium sulfate, in situ, by adjustment of the amount of excess acid used in acidulation.

In one mode of carrying out the invention, phosphate rock is treated with an aqueous solution of sulfuric acid, the solution containing a proportion of $H_2SO_4$ substantially in excess of that theoretically required to convert the $P_2O_5$ content of the phosphate rock entirely to phosphoric acid. The acidulation reaction may be represented in the following manner:

$$Ca_3(PO_4)_2 + 3H_2SO_4 + xH_2SO_4 \rightarrow 3CaSO_4 + 2H_3PO_4 + xH_2SO_4$$

From the above equation it is apparent that 6 equivalents of acid, corresponding to 3 mols of $H_2SO_4$, are required to convert one mol of $Ca_3(PO_4)_2$, containing 1 mol of $P_2O_5$, completely to phosphoric acid. We have found that the amount of excess acid required in the process of the invention to obtain the superior advantages thereof (acidulation reaction suitable for continuous operation and elimination of curing period prior to ammoniation), must constitute at least two equivalents of acid, amounting to one mol of $H_2SO_4$, per mol of $P_2O_5$ (i. e. $x$ in the equation is at least one). If less than two equivalents of excess acid are employed, the conditions necessary to eliminate the curing period for the acidulated phosphate material cannot be realized. It has been found that the upper limit of excess acid is in the neighborhood of about 18 equivalents thereof, or about 9 mols of $H_2SO_4$ per mol of $P_2O_5$ to be converted, such upper limit not being critical but rather one of economic considerations. Generally, however, the amount of excess $H_2SO_4$ does not exceed 12 equivalents or 6 mols thereof. Hence, in the above equation, the value $x$, representing mols of excess $H_2SO_4$ employed, is generally in the range of 1 to 6. On a percentage basis, the amount of excess acid used may be stated to be a minimum of 33%, and a maximum of 300%, and usually in the range of 33-200% of that theoretically required for conversion of the tricalcium phosphate or $P_2O_5$ content of the rock completely to phosphoric acid. Experience has shown that the use of from 3 to 9 equivalents of excess acid per mol of $P_2O_5$ to be converted to $H_3PO_4$, corresponding to a range of excess acid of 50-150% and a value for $x$ in the above equation of from 1½ to 4½, produces more desirable results, a quantity of excess acid in the neighborhood of 100% being preferred.

In the instant case one equivalent is intended to denote the quantity of acid which contains one formula weight of hydrogen ion, i. e. ½ mol $H_2SO_4$, 1 mol $HNO_3$, ⅓ mol $H_3PO_4$, etc.

While it is desirable to maintain the amount of water present in the rock-acid mixture throughout the acidulation reaction at a minimum, in ordinary practice substantial amounts of water may be present in the reaction mixture as result of the use of inexpensive commercial aqueous acids. Thus, in practical operation of our process, aqueous solutions of sulfuric acid of say 40-95%, usually 60-95%, strength may be employed. In ordinary practice the water content (total $H_2O$) of the reaction mixture is maintained in the range of about 8 to 120 parts per 100 parts of phosphate rock.

The acidulation reaction is exothermic, the temperature rising as the reaction progresses. While the acid used may be preheated to a temperature as high as 100° C. or more, when sulfuric acid of about 60% strength is used, it is generally preferable not to preheat the acid medium above about 80° C. as higher temperatures tend to increase the insoluble $P_2O_5$ content of the product. However, with sulfuric acid concentrations higher than 60%, preheating to above 80° C. may have some beneficial effects. Reaction temperatures during acidification may be in the range 50–150° C. The time required for complete reaction will depend upon the original composition and particle size of the phosphate rock, the composition, concentration and temperature of acid medium employed, the proportion of acid to phosphate to be reacted upon the intensity of agitation of the mixture. Combinations of conditions may be selected which will permit the reaction to be carried out in a matter of as little as 5 minutes or less, thereby rendering the process particularly susceptible to continuous operation.

In order to have a minimum proportion of undissolved $P_2O_5$ remaining after acidulation for such a period, the phosphate rock should be ground to a particle size sufficiently small to permit rapid attack by the acid. Generally, it is preferable that the particle size of the phosphate rock used in accordance with the invention be such as to pass through a 100 mesh (U. S. standard) sieve, and for best results the particles should pass a 200 mesh sieve. Thus, for example, employing 80% sulfuric acid as acidulating agent containing 100% excess $H_2SO_4$, it is preferred that the particle size of the phosphate rock be such as to pass a 200 mesh sieve in order to convert substantially all of the $P_2O_5$ content of the rock to soluble form in a period as short as 5 minutes.

The completely reacted mixture from the acidulation step, usually in the form of a slurry, may then be brought immediately into contact with an ammoniating agent. The ammoniating agent may be gaseous or liquid anhydrous ammonia, aqueous ammonia solutions or solutions of ammonium nitrate and/or urea in anhydrous ammonia or aqueous ammonia. The proportion of free ammonia in the ammoniating medium is ordinarily sufficient to neutralize the free acid content of the mixture and to transform substantially all of the phosphoric acid, excess sulfuric acid and a substantial proportion of the calcium sulfate therein to dicalcium phosphate and ammonium phosphates as the essential available phosphate bearing materials, and ammonium sulfate.

As a general rule our development work indicates that a proportion of about 5 to 9 mols of ammonia should be used per 10 equivalents of total acid employed in the acidulation step, the proportion of ammonia employed increasing with the quantity of acid used. To illustrate, a proportion near the lower limit of 5 mols of ammonia per 10 equivalents of acidulating acid should be utilized where the quantity of acid employed is on the order of the 33% excess noted above; on the other hand, a proportion near the upper limit of 9 mols of ammonia per 10 equivalents of acidulating acid should be utilized where the amount of excess acid used is in the neighborhood of 200–300%; and 7–8 mols of ammonia per 10 equivalents of acidulating acid is most suitable where the amount of excess acid is on the order of 100%. We have found that from about 6 to 8 mols of ammonia per 10 equivalents of acidulating acid give good results where the quantity of excess acidulating acid is in the preferred 50–150% range.

In accordance with the invention, the ammoniation is preferably carried out in an aqueous medium. Where the amount of water present in the acid-phosphate mixture following acidulation is comparatively small, it is preferred to introduce additional water into the mixture before ammoniation, e. g. to act as a cooling medium for preventing inordinately high temperatures. Under usual conditions of operation, the acidulated mixture subjected to ammoniation may contain up to about 50% by weight of water.

The ammoniation reaction is highly exothermic and may attain a maximum temperature during reaction of between 25° and 180° C. Avoidance of excessively high temperatures during ammoniation is desirable in order to decrease the tendency of the soluble $P_2O_5$ in the mixture to revert to "citrate-insoluble" forms. Due to the heat evolved in the reaction, it is apparent that a substantial amount of water may be evaporated during the ammoniation period. The time required for ammoniation is, like the acidulation reaction, very short and may be on the order of 15 minutes or less.

The nitrogen introduced into the fertilizer material through ammoniation constitutes a valuable fertilizer ingredient in addition to the available phosphorus or $P_2O_5$ content thereof, and it is accordingly apparent that the use of excess acid in the acidulating step in accordance with the principles of the invention enables the taking up of more ammonia during the subsequent ammoniating operation for reaction with the excess acid, thus introducing more nitrogen into the fertilizer material than would ordinarily be the case in present conventional processes for producing nitrogen-phosphate containing fertilizers using smaller quantities of acid for acidulation of the rock. Hence, this feature enables preparation of a fertilizer material containing the required amount of nitrogen as well as phosphorus in accordance with the principles of the invention without the necessity for making additions of ammonium compounds, e. g. ammonium sulfate, to the fertilizer following ammoniation.

The material obtained after ammoniation is ordinarily in the form of a slurry or paste containing variable amounts of moisture. This fluid to plastic material can readily be dried, such drying usually being carried out at temperatures between 70° and 120° C. Before or during the course of drying, the product takes on a plastic consistency. This plasticity renders the material readily susceptible of granulation as by tumbling in a revolving cylinder. Upon further drying, the final fertilizer product is of a uniform, chemically stable, free-flowing, non-caking, and preferably granular nature. Such product may be bagged without the usual curing period following ammoniation. When using sulfuric acid as acidulating agent, the product of ammoniation contains principally dicalcium phosphate, ammonium phosphate and ammonium sulfate, along with calcium sulfate, some insoluble phosphate, reaction products of these materials with potash salts, where the latter have been added at a suitable stage in the process, plus a small amount of moisture. The above is not to be construed as an exact enumeration of the crystalline substances contained in this stabilized fertilizer product since it is to be understood that various double salts and solid solutions of these substances are probably present.

When operating in accordance with the principles of the invention using sulfuric acid containing the preferred 50–150% excess $H_2SO_4$ as acidulating medium, the product of ammoniation generally contains about 10–15% available $P_2O_5$ based on the weight of the material (exclusive of potash salts) and an available nitrogen content of about 8–13%. Fertilizer compositions having the foregoing available $P_2O_5$ and nitrogen percentages are of wide general application and marketability. However, the invention is not limited to production of fertilizer materials of the above noted available $P_2O_5$ and nitrogen contents, and fertilizer products outside this range but produced in accordance with the invention process are also commercially valuable.

In a modification of the process described above, mixtures of sulfuric and nitric acids may be substituted as acidulating agent in place of sulfuric acid alone. It is thereby possible to obtain nitrogen-phosphate base fertilizer mixtures in which a part of the ammonium sulfate formed from the excess sulfuric acid is replaced by ammonium nitrate produced from the excess nitric acid on ammoniation. The use of nitric acid in conjunction with sulfuric is desirable in that it enables the nitrogen content of the final product to be raised by replacement of some of the ammonium sulfate with ammonium nitrate, and also facilitates more rapid and complete conversion of the phosphate rock to phosphoric acid during acidulation.

In accordance with the invention, mixtures containing at least 2 equivalents of $H_2SO_4$ per 3 equivalents of $HNO_3$ are employed. However, acid mixtures containing about equivalent proportions of $H_2SO_4$ and $HNO_3$ are preferred. The proportions of sulfuric acid and nitric acid may be adjusted to obtain desirable ratios of nitrogen to phosphorus in the ammoniated products.

The conditions noted above in regard to amount of excess acid required during acidulation using sulfuric acid alone also obtain with respect to use of sulfuric-nitric acid mixtures. Thus, where 8 equivalents of acid per mol of $P_2O_5$ are employed, corresponding to 2 equivalents or 33% excess acid, there may be present, for example, 8 equivalents of $H_2SO_4$ or 4 equivalents of $H_2SO_4$ and 4 equivalents of $HNO_3$, or 6 equivalents of $H_2SO_4$ and 2 equivalents of $HNO_3$, or 3.2 equivalents of $H_2SO_4$ and 4.8 equivalents of $HNO_3$. Further, assuming the use of 12 equivalents of acid per mol of $P_2O_5$, corresponding to 6 equivalents or 100% excess acid, there may be present say 9 equivalents of $H_2SO_4$ and 3 equivalents of $HNO_3$.

The product of acidulation is generally in the form of a slurry which may contain essentially phosphoric acid, nitric acid, calcium sulfate and calcium nitrate, where the amount of sulfuric acid present is not sufficient to react with all of the tricalcium phosphate of the rock. Under the circumstance of the presence of more sulfuric acid in the sulfuric-nitric acid acidulation mixture than will react with all of the tricalcium phosphate, the reaction slurry will be composed essentially of phosphoric acid, sulfuric acid, nitric acid and calcium sulfate, substantially no calcium nitrate being formed. While nitric acid is present in the acid medium employed in this modification, the reaction, particularly in preferred operation, involves essentially sulfuric acid acidulation wherein a substantial proportion of calcium sulfate is formed.

In using sulfuric-nitric acid mixtures the same precautions should be observed as to amount of water present in the acid-phosphate reaction mixture as in the case of the use of aqueous solutions of sulfuric acid alone.

As previously noted, particle size of the rock is important to rapid and efficient attack of the $P_2O_5$ content of the rock by the acid. We have observed, for example, that when using an acidulating mixture containing one equivalent of $H_2SO_4$ for each equivalent of $HNO_3$ and a 100% excess of total acid, it is advisable that the phosphate rock be ground to a particle size sufficiently small to at least pass a 100 mesh sieve.

On completion of the sulfuric-nitric acidulation, the reaction mixture may first be diluted, if necessary, in accordance with the invention, and the resulting slurry immediately subjected to the action of ammonia as described above. Ordinarily, the amount of ammonia employed in this modification is within the same range noted above with respect to use of sulfuric acid alone as acidulating agent, namely 5–9 mols of ammonia per 10 total equivalents of acid utilized in acidulation, higher proportions of ammonia within this range being employed with higher percentages of excess acid. Also, as noted above with respect to the use of sulfuric acid, it is desirable to employ from about 6–8 mols of ammonia per 10 total equivalents of acid where the amount of excess acid used is in the preferred 50–150% range.

The product of ammoniation of the acid-phosphate mixture using $H_2SO_4$-$HNO_3$ mixtures as acidulating agent in the manner described above, may contain principally dicalcium phosphate, ammonium phosphates, ammonium nitrate and ammonium sulfate, along with calcium sulfate, some insoluble phosphate and other impurities. This product may also be in the nature of a slurry or thin paste capable of being blended with potash salts and granulated before or after partial drying. Upon complete drying and cooling the product is obtained preferably as hard granular particles. In general practice the ammoniated fertilizer material of this $H_2SO_4$-$HNO_3$ modification using 50–150% excess acid contains 9–15% by weight of the material (exclusive of the potash salts) of available $P_2O_5$ with available nitrogen content of about 8–19%.

In still another modification of the invention, the acidulating medium may consist of mixtures of sulfuric and phosphoric acids, or of sulfuric, nitric and phosphoric acids, containing at least 2 equivalents of $H_2SO_4$ for each 3 equivalents of phosphoric acid, or nitric and phosphoric acids. The phosphoric acid in the acidulating medium, in addition to aiding acidulation, has as its main function the introduction of further quantities of available $P_2O_5$ into the fertilizer product. Hence, the chief acidifying agent of the above mixtures containing phosphoric acid is sulfuric acid, although any nitric acid which may also be present in the acid medium aids the reaction.

While the minimum proportions of excess acid in these phosphoric acid containing mixtures is the aforementioned 33% value, usually the excess acid content of such mixtures runs considerably higher, e. g. up to 200–300% or more. When the sulfuric acid content of the phosphoric acid containing acidulating mixtures hereof is less than that required to react with all of the phosphate rock to convert the calcium content thereof to phosphoric acid and calcium sulfate, as in the case of an acid mixture containing only 2 equivalents of $H_2SO_4$ per 3 equivalents of $H_3PO_4$ and having only 33% total excess acid, some of the remaining calcium in the rock may be converted to monocalcium phosphate by the phosphoric acid present. This monocalcium phosphate, however, is converted to dicalcium phosphate in the subsequent ammoniation step. In any event, as previously noted, the reaction, particularly in preferred operation, involves essentially sulfuric acid acidulation wherein a substantial proportion of calcium sulfate is formed.

In ammoniating acid-phosphate mixtures wherein phosphoric acid was present in the original acidulating medium, from 5 to 9 mols of ammonia are generally employed per 10 equivalents of total acidulating acid. The final product of ammoniation, when utilizing phosphoric acid as a portion of the acidulating medium, will generally contain a substantially higher proportion of available $P_2O_5$ than in the case where sulfuric acid, alone or in combination with nitric acid, is employed for acidulation.

In the invention process, potash salts, e. g. KCl, $K_2SO_4$ and the like, may be incorporated into the fertilizer material prior to, during, or subsequent to ammoniation but particularly before the mixture is dry, in order to provide potassium values. The term "potash salts" as employed herein and as commonly used in the industry, is intended to denote potassium salts. Other fertilizer ingredients may also be introduced in like manner into the nitrogen-phosphate containing compositions hereof to produce a "complete" fertilizer. These include minor constituents such as compounds of boron, manganese, copper and zinc, and so-called dusting agents, e. g. diatomaceous earth, clays, finely ground dolomite and magnesium silicate, to enhance the free-flowing characteristics of the fertilizer product.

The following examples are illustrative of the process of the invention, all quantities being expressed in parts by weight:

*Example 1.*—About 600 parts of fine phosphate rock containing about 35% $P_2O_5$ and ground so that 90% passed a 200 mesh sieve, were introduced into a mixer, and 1125 parts of 80% sulfuric acid, initially at a temperature of 94° C., were also fed to the mixer. After vigorous agitation for 5 minutes, the resulting rock-acid mixture reached a temperature of 125° C. and was in the form of a slurry containing approximately 426 parts of 100% sulfuric acid, 267 parts of 100% phosphoric acid, 658 parts of calcium sulfate and some water and impurities. About 100% excess sulfuric acid was employed in the reaction.

The resulting slurry was then immediately transferred to an ammoniating chamber, and about 223 parts of ammonia gas were passed into the chamber and absorbed by the slurry, which was maintained under vigorous agitation during the ammoniation period, the temperature of the reaction mixture rising to a maximum of about 140° C. The amount of ammonium employed was about 7 mols per 10 equivalents of total $H_2SO_4$ utilized for acidulation. The heat liberated during ammoniation along with the high temperature produced caused rapid vaporization of moisture, and the resulting thick reaction mass was fed to a dryer and rapidly dried therein by means of hot air.

About 1660 parts of dried product in an essentially granular condition were obtained containing 11.0% nitrogen, 11.5% "citrate-soluble" $P_2O_5$ and about 1% "citrate-in-soluble" $P_2O_5$. The product was composed of about 105 parts of ammonium phosphates, mostly in the form of monoammonium phosphate with some diammonium phosphate, 245 parts of dicalcium phosphate, 35 parts of insoluble calcium phosphates, 805 parts of ammonium sulfate, 414 parts of calcium sulfate, plus moisture and other minor constituents. By addition of about 300 parts potassium chloride and 40 parts of diatomaceous earth as dusting agent, to the above product, there may be obtained about 2000 parts of a mixture containing 9.3% nitrogen, 9.5% "citrate-soluble" $P_2O_5$ and 9.3% $K_2O$. Products prepared in the foregoing manner constitute excellent free-flowing fertilizer materials readily packaged for marketing and use. The process of this example may be readily carried out either batchwise or in a continuous manner.

*Example 2.*—About 100 parts of phosphate rock were reacted with 188 parts of 80% sulfuric acid. The amount of $H_2SO_4$ utilized constituted an excess of about 100% over that required to convert the entire $P_2O_5$ content of the rock to phosphoric acid. The initial temperature of the acid employed was about 90° C. and the maximum temperature of the reaction mixture was 150° C. About 10 minutes was required for the acidulation to be completed. The product was thinned by addition of 112 parts of water.

43.4 parts of ammonia gas were then introduced into the resulting slurry from the acidulation reaction over a period of about 22 minutes during which time the maximum temperature reached about 111° C. On the order of 8–9 mols of ammonia were taken up per 10 equivalents of total $H_2SO_4$ employed in acidulation. About 11% by weight of the product obtained was in the form of available $P_2O_5$ (both water-soluble and "citrate-soluble"), and the product contained about 10% total nitrogen content essentially entirely in the form of ammoniacal nitrogen. This product could be readily dried, pulverized and packaged for use as a fertilizer.

*Example 3.*—Approximately 625 parts of fine phosphate rock containing 35% $P_2O_5$ and ground so that 90% passed a 200 mesh sieve, were intimately mixed with an acid medium consisting of 344 parts of 93% sulfuric acid and 762 parts of 60% nitric acid, constituting about 0.9 equivalent of $H_2SO_4$ for each equivalent of $HNO_3$, at an initial temperature of 55° C. An excess of about 50% acid was present in the reaction mixture. After the reaction had proceeded for about 5 minutes with agitation, the temperature of the reaction mixture rose to about 70° C. The resulting mixture, after the 5 minute acidulation period, was in the form of a mobile slurry containing approximately 288 parts of phosphoric acid, 222 parts of nitric acid, 444 parts of calcium sulfate, 249 parts of calcium nitrate, and some water and impurities.

This slurry was then treated with anhydrous ammonia, the slurry being vigorously agitated during absorption of approximately 140 parts of ammonia, amounting to about 6 mols of ammonia per 10 total equivalents of mixed acid used in acidulation. On completion of ammoniation, the mass was dried at about 60° C. to a partially crystalline material containing about 1% moisture. About 1520 parts of product were thus obtained containing 13.6% total nitrogen of which a little more than half was in the form of ammoniacal nitrogen, 14.2% total $P_2O_5$ and 13.7% available $P_2O_5$. The product consisted of 242 parts of dicalcium phosphate, 133 parts of ammonium phosphate, 525 parts of ammonium nitrate, 34 parts of ammonium sulfate, 22 parts of insoluble phosphate, 436 parts of calcium sulfate hemihydrate, plus some moisture and impurities.

By addition of 329 parts of potassium chloride and 151 parts of dusting agent to the ammoniated product, there may be obtained 2000 parts of a mixture containing 10.4% total nitrogen, 5.8% ammoniacal nitrogen, 10.4% available $P_2O_5$ and 10.3% $K_2O$, which mixture is easily adapted to packaging and constitutes a rich fertilizer material.

*Example 4.*—Approximately 100 parts of phosphate rock were mixed with an acid medium containing 60 parts of 80% phosphoric acid and 343 parts of 70% sulfuric acid. The ratio of acids present in the acid medium constituted about 3 equivalents of $H_2SO_4$ for each equivalent of $H_3PO_4$, and the total amount of acid utilized was between 300 and 400% in excess of that required to convert the entire $P_2O_5$ content of the rock to phosphoric acid. The initial temperature of acidulation was about 90° C. with maximum temperature of the reaction mixture 107° C. The time required for acidulation was about 5 minutes. On completion of acidulation, 72 parts of ammonia were passed into the acid reaction mixture which was in the form of a slurry containing $H_3PO_4$, $CaSO_4$ and $H_2SO_4$. The ammoniation reaction required about 28 minutes for completion, the maximum temperature attained in the reaction being about 175° C. About 476 parts of product, on the dry basis, were obtained containing about 13.5% available $P_2O_5$ and 12.4% total nitrogen in the form of ammoniacal nitrogen, and consisted of 18 parts dicalcium phosphate, 88 parts ammonium phosphates, 228 parts ammonium sulfate, 98 parts calcium sulfate and 44 parts of minor ingredients. This mixture could be dried, pulverized and readily packaged for use as a fertilizer.

From all of the foregoing, it is apparent that the process of the invention enables production of a commercially valuable nitrogen-phosphate base fertilizer containing dicalcium phosphate by completely continuous operation of the entire process in a period of time on the order of minutes, wherein the long curing stage required between the acidulation and ammoniation steps of the conventional ammoniated superphosphate process is eliminated. Further, by practice of the invention process, a "complete" fertilizer containing the required amounts of nitrogen, phosphorus, potash salts and minor elements may be prepared in a single continuous operation without the need for adding extraneous materials, such as ammonium sulfate, to the ammoniated phosphate material, in order to supply the desired nitrogen content.

Moreover, an additional advantage of our process resides in production of a uniform and essentially stable product on ammoniation, requiring no aging prior to bagging. In common practice of the invention, e. g. where the potash salts and minor elements or constituents are introduced before or during ammoniation, since a substantially aqueous medium exists in the mixture, the ionic reaction proceeds practically instantaneously, and the elevated temperature facilitates the establishment of equilibrium. Because of the low moisture content of the dried product, its granular nature and the chemical stability of the crystalline phases, the material has relatively little tendency to cake.

Since various changes may be made in the invention without departing from the spirit thereof, the invention is to be taken as limited only by the scope of the appended claims.

We claim:

1. A continuous process for preparing a nitrogen-phosphate base fertilizer, which comprises reacting phosphate rock composed essentially of particles of a size capable of passing a 100 mesh sieve, with an aqueous acid medium containing at least about 2 equivalents of $H_2SO_4$ for each 3 equivalents of any other acid for a period of about 5–10 minutes to convert substantially the entire phosphate content of the rock to $H_3PO_4$, the total amount of acid being at least 33% in excess of that theoretically required to effect such conversion to $H_3PO_4$, and the water content of the reaction mixture being 8 to 120 parts per 100 parts of phosphate rock, subjecting the resulting slurry comprising $CaSO_4$, $H_3PO_4$ and excess acid without any previous curing step, to reaction with ammonia in an amount of 6–8 mols per 10 equivalents of acid employed in acidulation, for a time sufficient to convert said $H_3PO_4$ essentially to dicalcium phosphate and ammonium phosphates, the ammoniation reaction reaching a maximum temperature of 25–180° C., recovering a fluid to plastic mass of material, drying and granulating said material, and obtaining as product a uniform, stable, free-flowing, granular fertilizer composition containing dicalcium phosphate, ammonium phosphates and ammonium sulfate.

2. A continuous process for preparing a nitrogen-phosphate base fertilizer, which comprises reacting phosphate rock composed essentially of particles of a size capable of passing a 100 mesh sieve, with an aqueous acid medium comprising essentially an acid of the group consisting of sulfuric acid and mixtures of sulfuric and nitric acids, containing at least about 2 equivalents of $H_2SO_4$ for each 3 equivalents of $HNO_3$ for a period of about 5–10 minutes to convert substantially the entire phosphate content of the rock to $H_3PO_4$, the total amount of acid being 50–150% in excess of that theoretically required to effect such conversion to $H_3PO_4$, and the water content of the reaction mixture being 8 to 120 parts per 100 parts of phosphate rock, subjecting the resulting slurry comprising $CaSO_4$, $H_3PO_4$ and excess acid without any previous curing step, to reaction with ammonia in an amount of 6–8 mols per 10 equivalents of acid employed in acidulation, for a time sufficient to convert said $H_3PO_4$ essentially to dicalcium phosphate and ammonium phosphates, the ammoniation reaction reaching a maximum temperature of 25–180° C., recovering a fluid to plastic mass of material, drying and granulating said material, and obtaining as product a uniform, stable, free-flowing, granular fertilizer composition containing dicalcium phosphate, ammonium phosphates and ammonium sulfate.

3. A continuous process for making a nitrogen-phosphate base fertilizer which comprises reacting phosphate rock composed essentially of particles of a size capable of passing a 100 mesh sieve, with an aqueous solution comprising essentially $H_2SO_4$ and $HNO_3$ for a period of about 5 to 10 minutes at a temperature of 50–150° C. there being between about 2 and about 9 equivalents of $H_2SO_4$ for each 3 equivalents of $HNO_3$ present in said solution and the total amount of acid being 50–150% in excess of that required to effect conversion of substantially the entire phosphate content of said rock to $H_3PO_4$, and the water content of the reaction mixture being 8 to 120 parts per 100 parts of phosphate rock, subjecting the resulting slurry comprising $H_3PO_4$, $CaSO_4$ and excess acid, without any previous curing step, to reaction with ammonia in an amount of 6–8 mols per 10 equivalents of acid employed in acidulation for a period of minutes sufficient to convert the $H_3PO_4$ formed essentially to dicalcium phosphate and ammonium phosphates, the ammoniation reaction reaching a maximum temperature of 25–180° C. recovering a fluid to plastic mass of material, drying and granulating said material, and obtaining as product a fertilizer composition containing about 9–15% available $P_2O_5$ and 8–19% available nitrogen, said composition comprising dicalcium phosphate, ammonium phosphates, ammonium nitrate and ammonium sulfate.

References Cited in the file of this patent

UNITED STATES PATENTS

| Number | Name | Date |
|---|---|---|
| 709,185 | Terne | Sept. 16, 1902 |
| 1,610,109 | Pease et al. | Dec. 7, 1926 |
| 2,057,025 | Hagens et al. | Oct. 13, 1936 |
| 2,504,545 | Waring et al. | Apr. 18, 1950 |

FOREIGN PATENTS

| Number | Country | Date |
|---|---|---|
| 306,103 | Great Britain | Feb. 20, 1930 |
| 316,583 | Great Britain | Dec. 1, 1930 |
| 413,636 | Great Britain | July 12, 1934 |
| 604,322 | Great Britain | July 1, 1948 |